March 25, 1958     R. M. BEAM     2,827,809
APPARATUS FOR BONDING STRIP MATERIAL
Filed July 23, 1954     4 Sheets-Sheet 1

INVENTOR.
RALPH M. BEAM
BY
HIS ATTORNEY

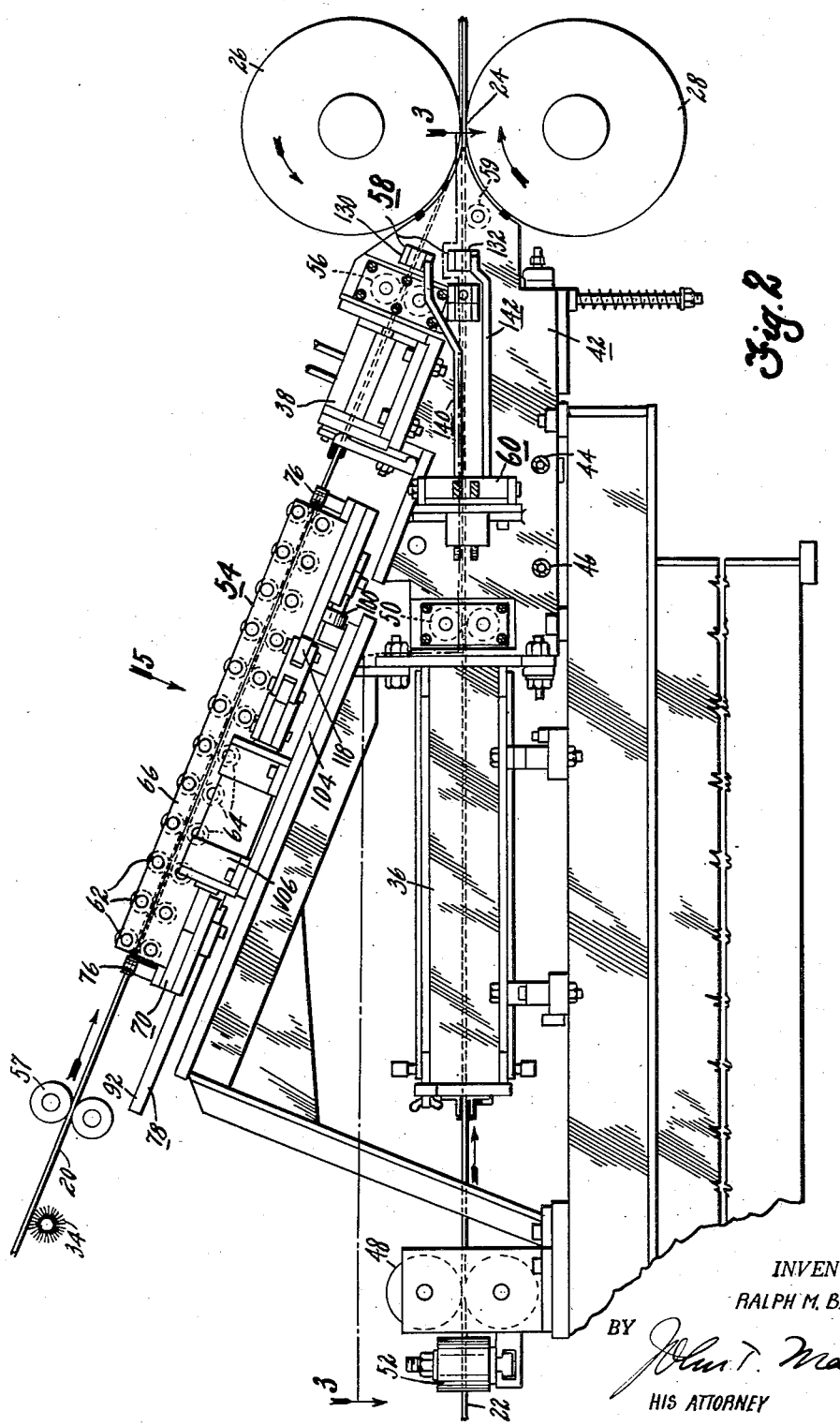

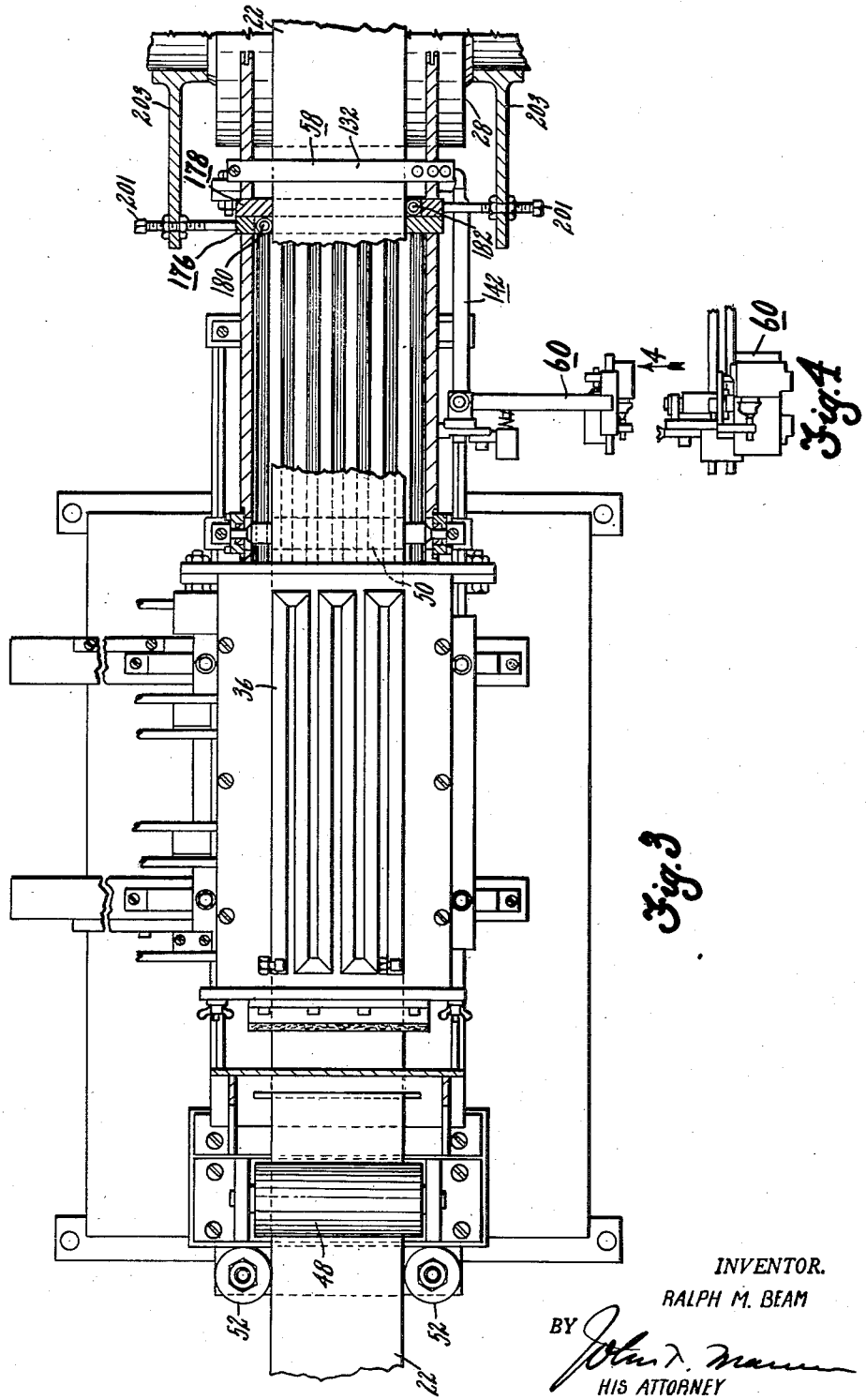

March 25, 1958 R. M. BEAM 2,827,809
APPARATUS FOR BONDING STRIP MATERIAL
Filed July 23, 1954 4 Sheets-Sheet 4
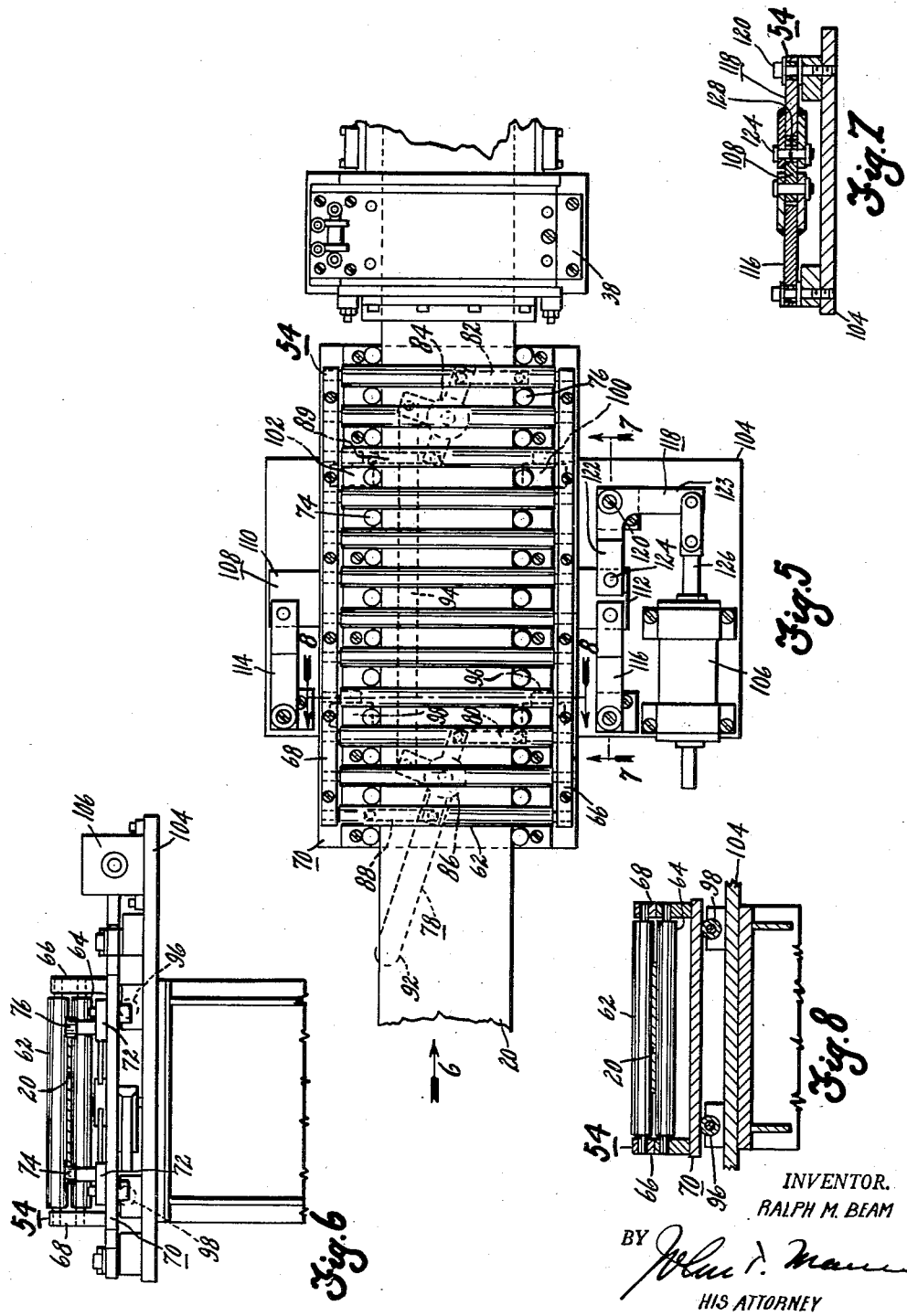
INVENTOR.
RALPH M. BEAM
BY
HIS ATTORNEY

United States Patent Office 2,827,809
Patented Mar. 25, 1958

2,827,809
APPARATUS FOR BONDING STRIP MATERIAL

Ralph M. Beam, Dayton, Ohio, assignor to General Motors Corporation, Detroit, Mich., a corporation of Delaware Application July 23, 1954, Serial No. 445,320

2 Claims. (Cl. 78—97)

This invention relates to the manufacture of bimetallic strips and is more particularly directed to an apparatus for conditioning and positioning the elements of the strip during the manufacturing thereof.

This invention is concerned with the alignment of two or more metallic strips during the lamination thereof into a composite strip wherein one of the strips is of softer material than the other and is deformed by a pair of pincher rollers which simultaneously reduces the thickness of the softer material and increases its length as both strips pass between the rollers to effect the lamination. It is well known that irregularities in thickness frequently occur in commercial strips. These irregularities, when the strips are rolled together, frequently cause one or both of the strips to be misaligned relative to each other. This misalignment is further aggravated when the supply of the strip materials is located remote from the deforming rollers and with other apparatus located between the source and rollers for preparing the strips for the rolling step. The above conditions are still further aggravated when one of the strips are appreciably deformed by the rollers. It is to the avoidance of this misalignment with its attending waste of material, etc., that the present invention is directed. The foregoing is accomplished with an apparatus that is positioned between the supply and the rollers and physically moves one of the strips without disturbing the location of the supply in response to any misalignment between the strips and/or any misalignment between the strips and rollers into proper alignment with the other to thus maintain alignment between the strips as the softer material strip is lengthwise deformed by the pincher rollers.

The above represents a departure and advance over the methods of aligning strips heretofore employed which include the repositioning of the entire supply of material when the materials to be operated upon are fed from a rolled supply to the laminating rolls.

An object therefore of the present invention is to provide an apparatus adapted for the conditioning and positioning of elements of a bimetallic strip prior to the manufacture thereof.

A further object of the present invention is to provide an aligning apparatus responsive to the misalignment between at least two moving metallic strips for aligning said strips relative to an apparatus adapted to operate upon said strips.

Another object of the present invention is to provide an aligning apparatus suitable for use with an apparatus adapted for forming a bond between at least two metallic moving strips. This object is accomplished by providing a shifting means for moving at least one of said strips transversely to its direction of movement and a means responsive to the position of the strips for actuating said shifting means.

Another object of the present invention is to provide an apparatus adapted to form a bimetallic strip from two moving elements. This object is materialized by providing; a means for conditioning elements of said strip, a heating means for maintaining elements of said strip at a predetermined temperature, means adapted to maintain the elements of said strip in a nonoxidizing atmosphere prior to the formation of a bimetallic strip therefrom, pincer rolls adapted for forming a bimetallic strip from said elements; and an aligning means responsive to the position of said elements for moving one of said elements relative to another element for maintaining alignment between the elements and for aligning said elements relative to the pincer rolls.

A further object of the present invention is to provide a pair of rollers adapted to deform at least one of two metallic strips while simultaneously applying a bonding pressure to each of said strips and an apparatus adapted for maintaining alignment between said strips prior to the entrance thereof into the bite of the rollers, said aligning apparatus including; a shifting means adapted for moving one of said strips transversely to the bite of the rollers, an actuating means responsive to the bite of the rollers, an actuating means responsive to the transverse location of each of said strips relative to the bite of said rollers and an intermediate means operatively connecting said actuating means with said shifting means for moving said shifting means in response to any misalignment between said strips.

Further objects and advantages of the present invention will be apparent from the following description reference being had to the accompanying drawings wherein a preferred embodiment of the present invention is clearly shown.

In the drawings:

Figure 1 diagrammatically shows the location of an aligning apparatus as used with another apparatus.

Figure 2 shows a side view of the aligning apparatus in Figure 1.

Figure 3 is a view along line 3—3 in Figure 2.

Figure 4 is a view in the direction of arrow 4 in Figure 3.

Figure 5 is a view in the direction of arrow 5 in Figure 2.

Figure 6 is a view taken in the direction of arrow 6 in in Figure 5.

Figure 7 is a cross-sectional view taken along lines 7—7 in Figure 5 and;

Figure 8 is a cross-sectional view taken along lines 8—8 in Figure 5.

Figure 1:
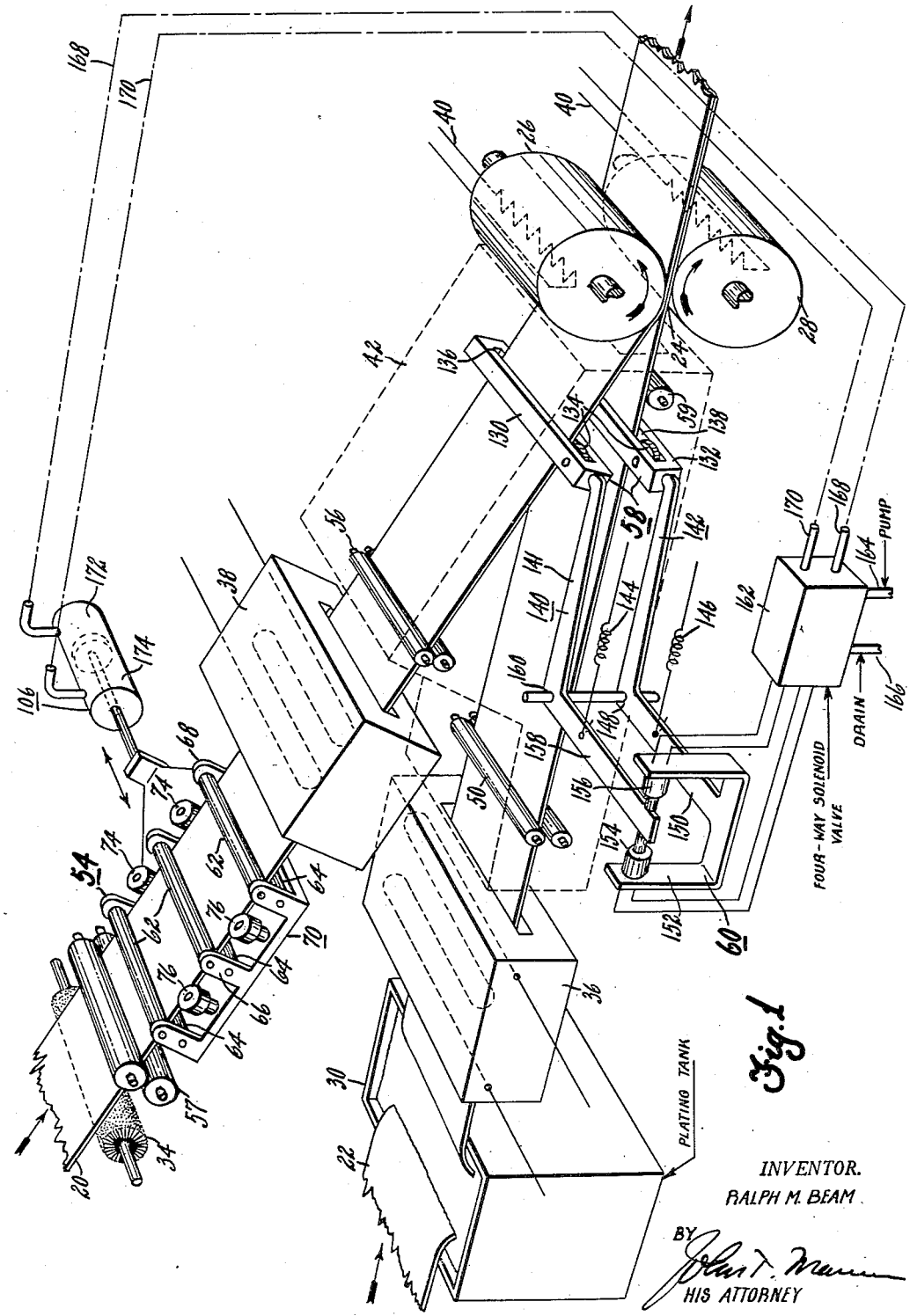

In the drawings, and in Figure 1 particularly, the embodiment of the present invention is adapted for use with a well known method for laminating two strips of different hardness such as aluminum and steel strips wherein the softer of the strips is deformed by pincer rollers for forming a composite laminated strip. When the apparatus shown is utilized, an aluminum or alloy strip 20 is bonded to a steel strip 22 by passing the strips between a bite 24 of a pair of vertically disposed rollers 26 and 28 that are constructed and arranged for moving the strips 20 and 22 through the various apparatus shown in the drawings as well as for applying a deforming pressure to the aluminum strips 20 and simultaneously exerting a bond pressure to each of the strips 20 and 22 to form a coextensive bond therebetween. To aid in the formation of the bond the steel strip 22 is preferably cleaned by a suitable metal cleaning apparatus, not shown, and is then passed into a plating tank 30 wherein a flash coating of copper is applied to one side of the steel strip 22. The bonding surface of the aluminum strip 20 is preferably cleaned by a rotating wire brush 34 for roughing the strip so a more perfect bond may be obtained.

It has been also found that the control of temperature of the various strips will add to the success of this bonding technique. To accomplish this control, a heating unit 36 is provided in the steel strip 22 and a second heating unit 38 may be provided for the aluminum strip 20 if desired. To further aid in the maintenance of the proper temperature, heating and/or cooling means 40, as required, are provided for the rollers as diagrammatically shown in Figure 1, for controlling the temperature at the bite 24 of the rollers 26 and 28.

It has further been found desirable in some cases to maintain one or both of the strips 20 and 22 in a non-oxidizing atmosphere prior to actual rolling thereof. This is accomplished by providing a chamber 42, Figure 2, disposed around the heated strips and heating units 36 and 38 wherein a nonoxiding atmosphere is constantly maintained. This atmosphere is constantly supplied through pipe connections 44 and 46 in the wall of a gas chamber 42, and is maintained under a pressure sufficient to replenish the gases escaping through the various openings in the chamber 42.

To properly guide the steel strip 22 vertical and horizontal guide rolls 52, 48 and 50 are provided, shown on Figure 2. These rolls maintain proper horizontal alignment on the steel strip as it passes into and from heating unit 36. To aid in the alignment of the aluminum strip 20, a shifting apparatus 54, which will be hereinafter more fully described, is located remote from a supply, not shown, so that it positions the strip prior to its entrance into the heating unit 38, in response to the position of the strip 20 adjacent its entrance into the bite 24 of rollers 26 and 28, to maintain the strip 20 in proper spaced relation to the walls of heating unit 38 and bite 24 of the rollers.

A pair of vertically arranged rolls 57, preferably covered with rubber or other suitable frictional material, are used to maintain proper tension on the strip 20 during its passage through the horizontal rolls, 56, heating unit 38 and aligning mechanism 54.

A single roll 59 positioned on the bottom surface of strip 22 constantly maintains the strip 22 in a proper position against the downward thrust thereon as caused by the rolls 26 and 28 and further prevent a wearing action on the positioning means 58 to be hereinafter described.

The aligning mechanism for the aluminum strip 20 comprises a shifting mechanism 54, a means 58 responsive to the alignment of the strips, and an intermediate mechanism 60 operatively connecting the responsive means 58 with the shifting means 54. Each of these will be hereinafter described.

The shifting means 54 diagrammatically shown in Figure 1 and specifically shown in Figures 2 to 8 of the drawings, has a plurality of pairs of horizontal rollers 62 and 64 through which the strip 20 passes. These rollers constantly prevent any buckling as the strip passes through the mechanism 54. Rollers 62 and 64 have the ends suitably journalled in bearings carried on frame members 66 and 68 which are connected to a carriage frame 70. The carriage frame 70 is also adapted to support a plurality of bars 72, Figure 6, longitudinally disposed along the edges of the strip 20 and adapted to carry a plurality of vertically disposed rollers 74 and 76, in Figures 5 and 6, and are adapted at all times to engage the edge of strip 20. The shifting apparatus may be changed to accommodate strips of various widths as rollers 74 and 76 are moved toward or away from each other and thus engage edges of strips. To accomplish the shifting of rollers 74 and 76, shifting mechanism 78 includes levers 80, 82, 88 and 89 each having one of the ends thereof connected to bars 72 and the other ends connected to rotatable levers 84 and 86, as shown in Figure 5 of the drawings. To actuate these elements lever arm 92 is operatively connected to levers 86 and 84 through lever 94 so when lever 92 is moved in a counterclockwise position the rolls 74 and 76 carried on bars 72 will approach each other and vice versa and be positioned to accommodate strips of any predetermined width.

The shifting means 54 is adapted to be moved transversely to the direction of the moving strip 20. This is accomplished by carrying the ends of carriage plate 70 on rollers 96, 98, 100 and 102 (Figures 5 and 8). The rollers in turn are mounted on a base plate 104 so as to permit transverse movement of carriage plate 70 thereon. A double acting actuator 106 is used to move the carriage plate 70 in either desired direction through a lever mechanism shown on Figures 5, 6 and 7 of the drawings. This lever mechanism includes a bar 108 so attached to carriage frame 70 that portions 110 and 112 extend past either side thereof. A pair of levers 114 and 116 each have one end pivoted on the base 104 and the other end pivotally attached to bar 108 at ends 110 and 112 respectively for providing a parallelogram movement between the various movable elements. An L-shaped lever 118 has its central portion pivoted at 120 and one of its extending arms 122 pivoted at 124 with end 112 of shifting bar 108 and the other arm 123 pivotally connected with a plunger 126 of actuator 106. From the above arrangement of parts it is apparent that when the plunger 126 of actuator 106 is moved to the right as seen in Figure 5, L-shaped lever 118 will be rotated about pivot 120 in a counterclockwise direction so as to impart a movement of the bar 108 and the supported rollers toward actuator 106 and when lever 126 is actuated to the left it will impart a movement away from actuator 106. It is apparent that if bar 108 is to move to any other position than a right angle position with respect to L-shaped lever 118, provision must be made for the lengthening of arm 122. To accomplish this lengthening, elongated slots 128, Figure 7, are provided in bar 108. This arrangement will permit the necessary limited movement between lever 118 and bar 108.

The means 58 which are responsive to the misalignment of the strips 20 and 22, are diagrammatically shown in Figure 1. These means 58 included a member 130 which has a slot 136 adapted to pass strip 20 therethrough and slotted member 132 which has a slot 138 similar adapted to pass strip 22. Each of these members 130 and 132 have a roller 134 in one end adapted to engage edge portions of the respective strips which pass through the slots 136 and 138. The rollers are maintained in constant contact with the edge portion of the strip by means of lever 140 and 142 which form a part of the intermediate means 60 and are spring loaded through springs 144 and 146. Members 130 and 132, because of the arrangement set forth, will constantly follow the transverse movement of strips 20 and 22 and actuate other portions of the intermediate means 60 as follows.

L-shaped lever 142, loaded by spring 146 against the responsive member 132, has its central portion pivoted at 148 and has an arm portion 150 carrying a U-shaped member 152 having a pair of micro switches 154 and 156 mounted thereon which are adapted to receive an arm 158 of L-shaped lever 140 therebetween. Lever 140 is pivoted at 160 and has arm portion 141 loaded by spring 144 toward responsive member 139. From the above arrangement of parts, it is apparent that as long as the strips are in satisfactory alignment, micro switches 154 and 156 will not be actuated. If, however, the steel strip 22 should move transversely to the rollers 26 and 28, and to the aluminum strip 20, lever 142 will pivot lever arm 150 at pivot 148, so that one or the other of the micro switches 154 or 156 will engage lever arm 158, which is stationary as it has not received actuation through lever 140, which is in contact with responsive member 130 which has not moved because of the relative constant position of the aluminum strip 20. Likewise should the aluminum strip 20 move transversely to the rollers and to the steel strip 22, the responsive member 130 will cause lever 140 to be pivoted at 160 for moving lever arm 158 relative to lever arm 150 so as to actuate the micro switches 154 or 156 in response to the movement of the aluminum strip.

The micro switches 154 and 156 are suitably electrically connected to a four-way solenoid valve 162 diagrammatically shown in Figure 1. This valve is adapted to direct fluid passing from a pump (not shown) through pipe 164 into the valve 162 and drain the excess of such fluid through pipe 166. When either of the micro switches 154 or 156 are actuated, valves, not shown, within the four-way solenoid valve 162 will open and pass fluid from the four-way solenoid valve 162 through conduits 168 or 170. When valve 162 is properly actuated by micro switches 154 or 156 the fluid pressure formed in conduit 168 will be transmitted to cylinder portion 172 of the actuator 106 and move the shifting means 54 for the aluminum strip 20 to the left as seen in Figure 1. Likewise when fluid pressure is directed through conduit 170 into cylinder portion 174 of actuator 106 the shifting means 54 will move to the right as seen in Figure 1.

In some instances it has been found desirable to constantly maintain one of said strips in one position of alignment with reference to the bite 24 of the rolls 26 and 28 as for example the steel strip 22. To accomplish this positioning means, 176 and 178, Figure 3, are provided. These positioning means have slots similar to the slots in elements 130 and 132 and include rollers 180 and 182, Figure 3, which are adapted to engage edges of the strips. Positioning means 176 and 178 are adapted to be moved transversely to the strip by an adjusting means, as in Figure 3 wherein set screws 201 are suitably adjustably carried by members 203 of the frame or other suitable structure, not shown, and when the set screws 201 are properly positioned the rollers 180 and 182 will be constantly in contact with the respective edges of the strip for maintaining the steel strip 22 in substantial alignment with the bite 24 of rollers 26 and 28. It is apparent the aluminum strip 20 will not always remain in alignment with the steel strip 22 when constant alignment of the steel strip is maintained. When this situation occurs the aforementioned positioning means 54 as actuated by either of the micro switches 154 or 156 will realign the aluminum strip 20 with the steel strip 22 and the rollers 26 and 28.

From the foregoing it is apparent that the shifting device according to the present invention is extremely sensitive and is adapted to be used in a wide variety of applications. It is particularly useful in connection with a pair of vertically disposed pincer rolls which are adapted to provide a bonding pressure suitable for forming a bimetallic strip from two elements as aluminum and steel strips wherein constant alignment is a necessity if the proper bonding is to be accomplished over the entire surface of the members. Manifestly the method and apparatus as set forth is suitable and may be modified to unite more than two strips or elements and the term bimetal is intended to include a composite strip laminated from at least two moving strips. It is to be further pointed out that when the aforementioned bonding is accomplished, the aluminum is elongated by the rollers so that for example, three times the amount of steel as aluminum passes the rollers and hence the rollers are prone to apply a skewing pressure to either of the strips as they move through the rollers. This skewing action of the strip would constantly tend to misalign the strips and the above aligning device is adapted to overcome this difficulty along with misalignment from other causes which may occur during the operation.

It is manifest that the use of the apparatus and method disclosed herein is applicable to other metals and is in no way limited to the joining of aluminum and steel which are cited as examples only. Any two metals that are capable of being united may be aligned and maintained in alignment in the teachings of this invention.

While the embodiments of the present invention constitutes a preferred form, it is to be understood that other forms might be adopted.

What is claimed is as follows:

1. In an apparatus for coextensively bonding aluminum and steel strips into a composite strip, the combination comprising; a pair of pressure rollers adapted to apply a bonding pressure to the strips while individually moving each of the strips from separate sources of supply, a second pair of rollers one of which is resiliently engaged with an edge portion of one strip and the other of which is resiliently engaged with the edge portion of the other strip, control means rendered effective by predetermined transverse shifting of either of said second mentioned pair of rollers as occasioned by transverse shifting of either of said strips while the strips move past said rollers, shifting means comprising rollers engaging both edges of one of said strips at a point between the pressure rollers and the second mentioned pair of rollers, and actuating means energized by said control means for causing said shifting means to bodily shift said one strip transversely and into alignment with said other strip whereby said control means are rendered ineffective.

2. In an apparatus for coextensively bonding aluminum and steel strips, the combination comprising; bonding means including a pair of rollers for applying a bonding pressure to the strips while individually moving each of said strips from separate sources of supply, and an aligning means between said sources of supply and said bonding means for maintaining said strips in axial alignment, said aligning means including a shifting means in engagement with the edges of one of said strips for bodily shifting the said one strip relative to the other strip and a means responsive to the position of both of said strips and operatively connected with said shifting means for actuating the shifting means whenever one of said strips is misaligned relative to the other of said strips.

References Cited in the file of this patent
UNITED STATES PATENTS

| | | |
|---|---|---|
| 889,948 | Moe | June 9, 1908 |
| 1,066,687 | Warren | July 8, 1913 |
| 1,163,565 | Schwartz | Dec. 7, 1915 |
| 1,691,772 | Maas | Nov. 13, 1928 |
| 1,697,958 | Manker | Jan. 8, 1929 |
| 1,858,436 | Dukhaut | May 17, 1932 |
| 1,955,072 | Jordan | Apr. 17, 1934 |
| 2,133,051 | Bollinger | Oct. 11, 1938 |
| 2,303,533 | Ferm | Dec. 1, 1942 |
| 2,414,511 | Dyar | Jan. 21, 1947 |
| 2,627,010 | Matteson et al. | Jan. 27, 1953 |
| 2,691,208 | Brennan | Oct. 12, 1954 |
| 2,713,011 | Durst | July 12, 1955 |